Oct. 30, 1956 L. G. MORSE ET AL 2,768,770
SEED PLANTING MACHINE
Filed March 5, 1953 4 Sheets-Sheet 1
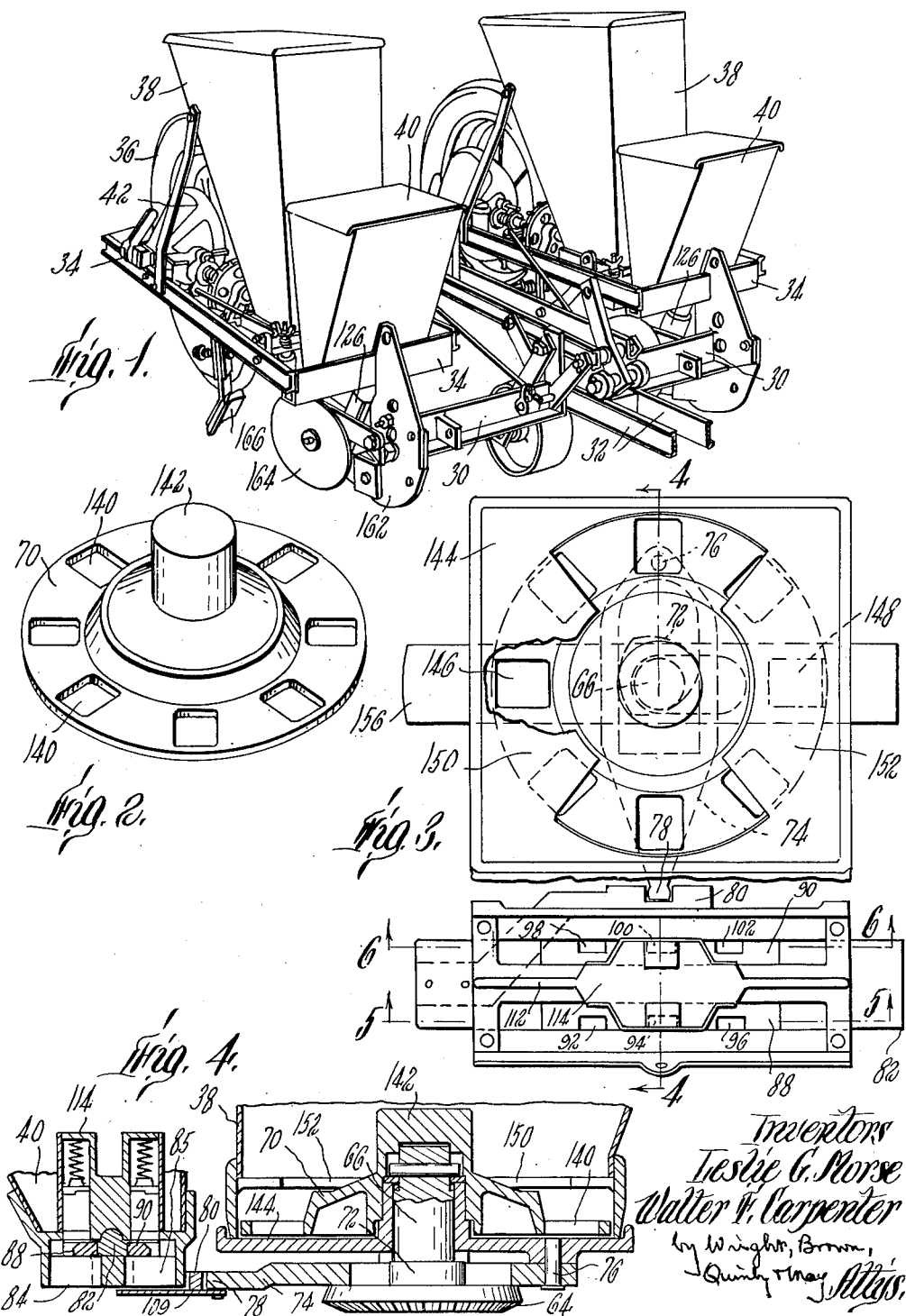
Inventors
Leslie G. Morse
Walter F. Carpenter Oct. 30, 1956   L. G. MORSE ET AL   2,768,770
SEED PLANTING MACHINE
Filed March 5, 1953   4 Sheets-Sheet 2

Inventors
Leslie G. Morse
Walter F. Carpenter
by Wright, Brown,
Quinby & May
Attys.

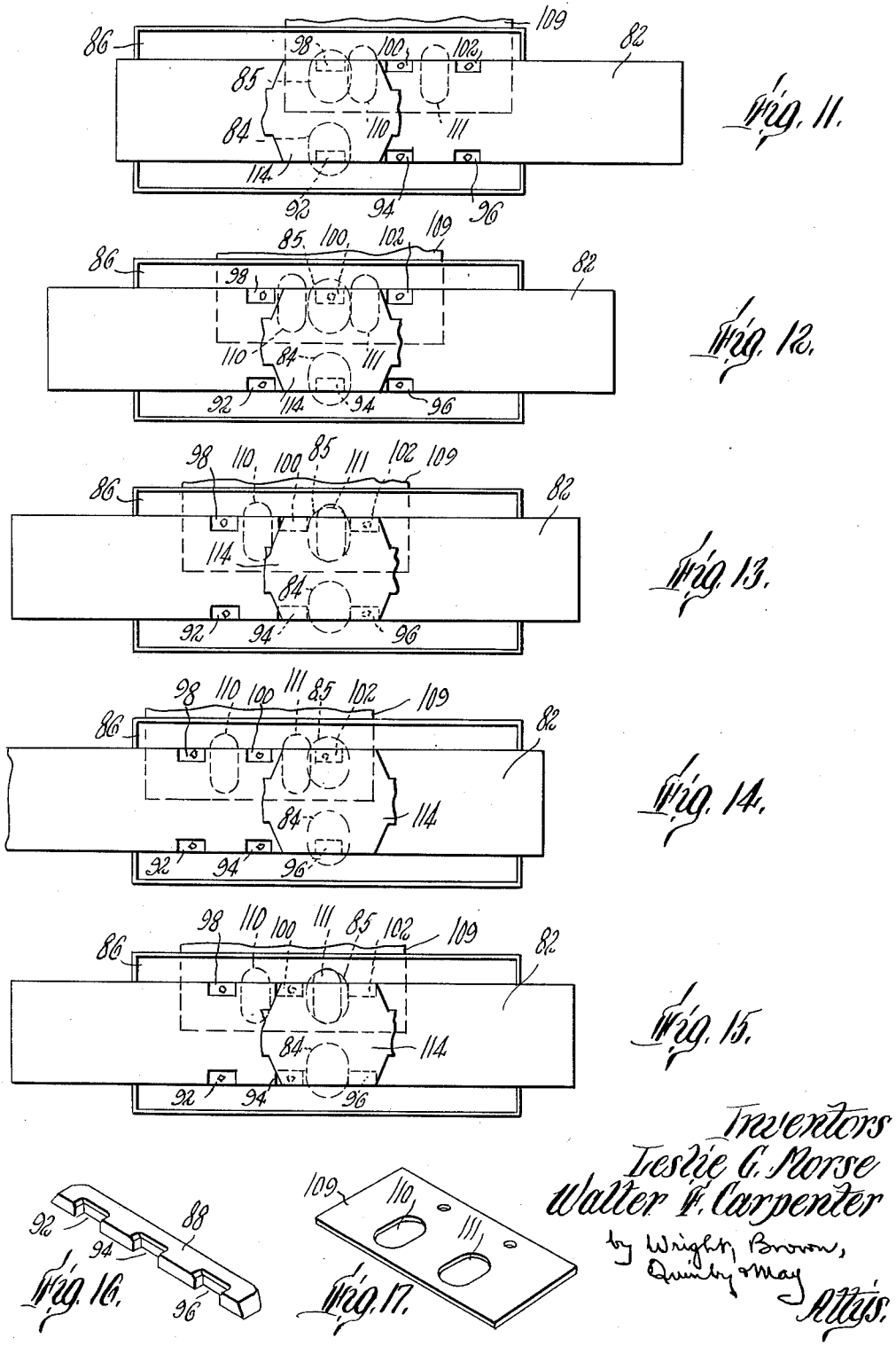

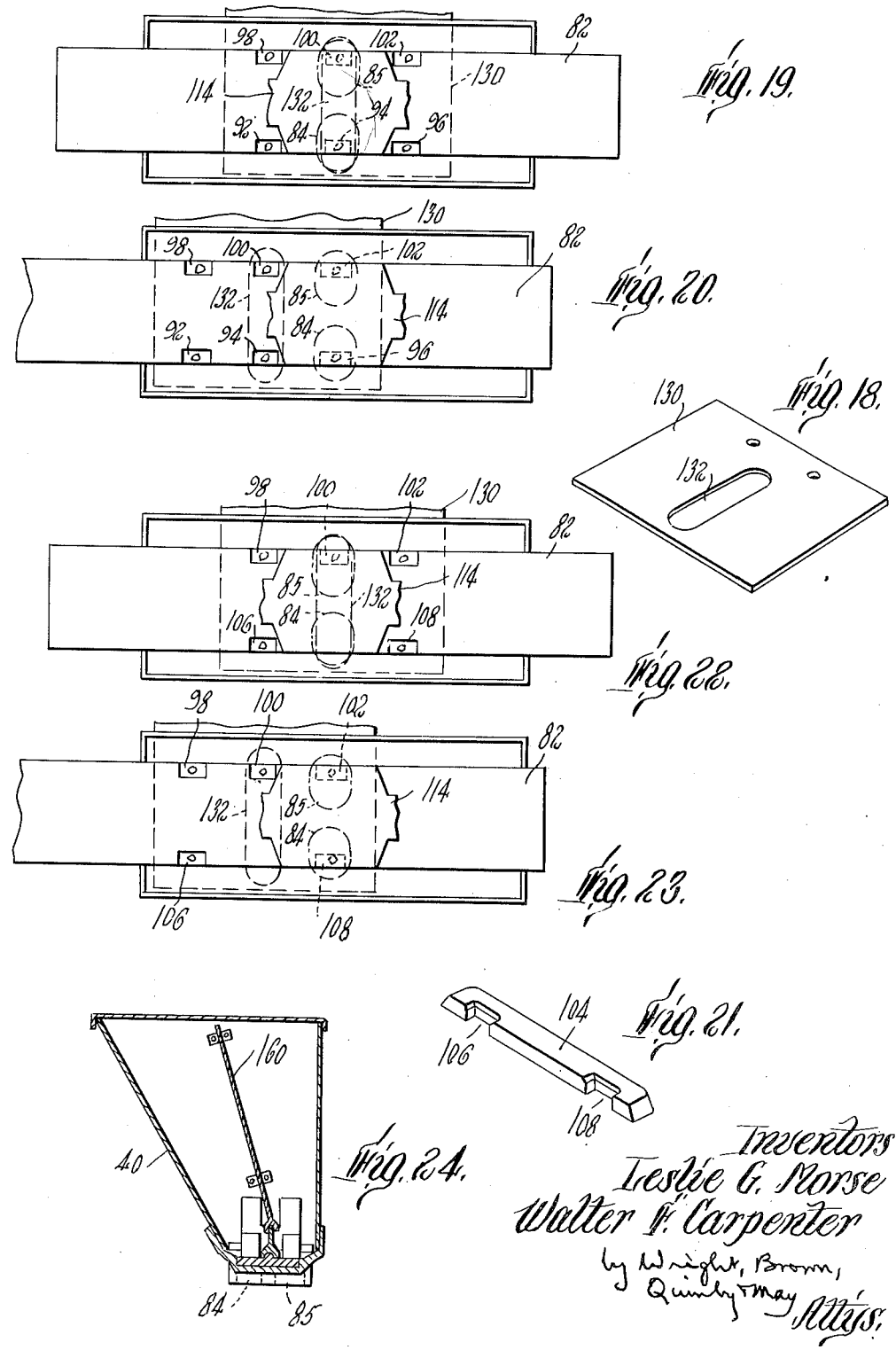

United States Patent Office 2,768,770
Patented Oct. 30, 1956

2,768,770
SEED PLANTING MACHINE

Leslie G. Morse, Randolph, and Walter F. Carpenter, South Royalton, Vt., assignors to The Sargent-Roundy Corporation, Randolph, Vt., a corporation of Vermont Application March 5, 1953, Serial No. 340,486

4 Claims. (Cl. 222—276)

This invention relates to an improved machine for planting seeds singly or in groups and for depositing measured quantities of fertilizer on either side of each seed or group of seeds at a lower level so as to be in the best position to promote the growth of the plants without "burning" the roots. While the machine can be made to plant various kinds of seeds, it is hereinafter described, for convenience, as made for planting kernels of corn. The machine is provided with mechanism which can readily be adjusted for drilling, that is, planting kernels singly or hilling, that is, planting groups of two, three or four kernels. Planting machines heretofore in use which are provided with mechanism for depositing fertilizer near the seeds operate to deposit the fertilizer in continuous lines on either side of the row of seeds, which is wasteful practice as much of the fertilizer is too far removed from the seeds to be useful in promoting the growth of the plants.

It is an object of the invention to provide improved and simplified mechanism which can easily be adjusted for drilling or hilling. It is a further object of the invention to provide means for depositing on either side of each kernel or group of kernels separate, spaced doses of fertilizer at points near enough to the kernels to benefit them, but not so near as to injure the roots of the plants which develop from the kernels. This results in a marked economy since the wasting of fertilizer by depositing much of it too far from the seed to be of any value is avoided.

Further advantageous features of the machine will be apparent from the following description thereof and from the drawings, of which:

Figure 1 is an isometric view of a complete machine embodying the invention;

Figure 2 is an isometric view of a fertilizer dispensing wheel;

Figure 3 is a plan view of the bottoms of the hoppers for fertilizer and seeds, some of the apparatus below the bottoms being indicated;

Figure 4 is a section on the line 4—4 of Figure 3;

Figures 11, 12, 13, 14 and 15 are diagrammatic plan views of the seed dispensing apparatus, showing successive stages of operation;

Figure 16 is an isometric view of a seed gauge;

Figure 17 is an isometric view of a distributing plate used when the machine is drilling;

Figure 18 is an isometric view of a substitute plate used when the machine is hilling;

Figures 19 and 20 are diagrammatic plan views of the seed dispensing apparatus with the substitute distributing plate;

Figure 21 is an isometric view of a substitute seed gauge;

Figures 22 and 23 are diagrammatic plan views of the seed dispensing apparatus with the substitute distributing plate and the substitute seed gauge; and Figure 24 is a sectional view of the seed hopper showing a removable partition member therein;

Figure 8:
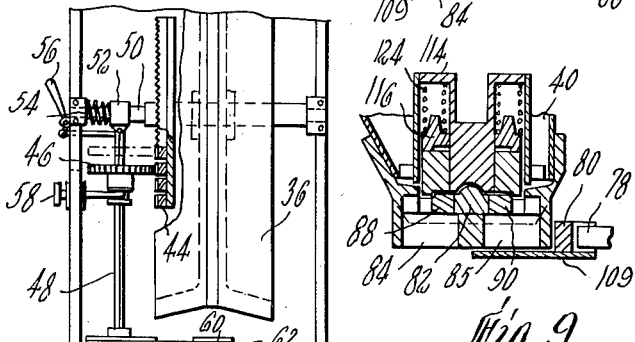
Figure 8 is a plan view, on a small scale, of one of the planting units shown in Figure 1; the hoppers having been removed and parts broken away to show in section.
Figure 10:
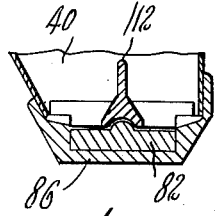
Figure 10 is a section on the line 10—10 of Figure 6.
Figure 9:
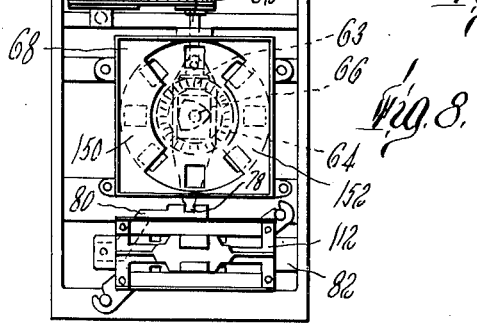
Figure 9 is a section on the line 9—9 of Figure 6.

The entire seed planting mechanism is illustrated in Figure 1 and consists of two identical units which are joined by a main frame 30 having draw bars 32 by which it can be towed. The main frame includes two rectangular frames 34 which carry the individual units. Since these units are similar to each other, a description of one will serve for both. Each unit is supported by a single vehicle wheel 36 near the rear end thereof and carries a hopper 38 for fertilizer and a smaller hopper 40 for seeds at the forward end. The vehicle wheel 36 is connected through a gear box 42 and other driving connections hereinafter described to two metering devices which operate to discharge separately spaced doses of commercial fertilizer and either individual seeds for drilling or groups of 2, 3 or 4 seeds for hilling. This gear box is preferably made with concentric circles of face gears for selective engagement with a pinion to be driven thereby at selected speeds. Figure 8 shows four such face gears 44 but in actual construction it is preferred to use twelve so as to give a wide flexibility of operation. These gears are adapted to mesh with a pinion 46 slidably splined on a shaft 48. The face gears 44 are mounted on the axle 50 of the vehicle wheel 36 so that when the pinion 46 is meshed with any one of the gears 44, the vehicle wheel 36 drives the shaft 48. The rear end of the shaft 48 is journalled in a collar 52 which is loosely mounted on the shaft 50 and is pressed toward the wheel 36 by a compression spring 54. A hand lever 56 is operable to swing the rear end of the shaft 48 away from the wheel 36 sufficiently to disengage the pinion 46 from the gears 44. The pinion can then be slid along the shaft 48 by a suitable handle 58 so as to mesh with some other selected one of the gears 44. The shaft 48 is connected to a central countershaft 60 by any suitable means such as a chain 62 running on sprocket wheels carried by the shafts 48 and 60. The countershaft 60 is connected by miter gears 63 and 64 to a vertical shaft 66. This vertical shaft projects up through the center of the floor 68 of the fertilizer hopper 38 and carries on its upper end a metering wheel 70, the rotation of which serves to dispense successive doses of fertilizer as hereinafter described. The vertical shaft 66 carries a cam 72 which is disposed in an opening in a lever 74. This lever is pivoted at its rear end as at 76 and projects forward, being rocked from side to side by the engagement of portions of the cam 72 with the sides of the opening in the lever as the cam rotates with the vertical shaft 66. The cam is so shaped, as indicated in Figures 3 and 8, that the forward end 78 of the lever 74 pauses briefly at each extreme end of a stroke and also in the middle of each stroke. The forward end 78 engages in a notch in an arm 80 which is bolted or otherwise secured to an elongaed slide 82. This slide 82 is provided with apertures adapted to receive single seeds or kernels from the hopper 40 and to discharge these seeds through ports 84 and 85 in the floor 86 of the seed hopper 40. These ports are centrally located in the hopper floor and are aligned in the direction of movement of the vehicle. The slide 82 oscillates along its long axis which is transverse with respect to the direction of advance of the vehicle and may be a single piece or may be a composite structure as illustrated.

For convenience in changing the seed planter to discharge groups of seeds of different numbers, the slide 82 is preferably made with removable marginal portions or seed gauges 88 and 90. The seed gauge 88 which is illustrated in Figure 16 has three apertures 92, 94, and 96, each of which is capable of receiving a single seed. The seed gauge 90 is identical in size and shape with the gauge 88 and has three apertures 98, 100 and 102. The seed gauges 88 and 90 are loosely assembled with the slide 82 and are maintained in place by the floor 86 on which the assembled slide moves. As hereinafter described the seed gauge 88 or 90 or both can be replaced by a seed gauge or gauges 104 (Figure 21) of similar size but equipped with only two apertures 106 and 108, the function of which is hereinafter described.

Figure 5:
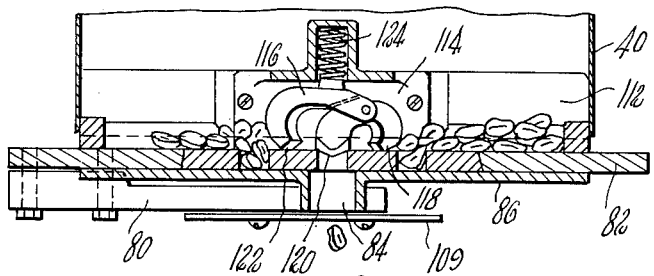
Figure 5 is a section on the line 5—5 of Figure 3.
Figure 6:
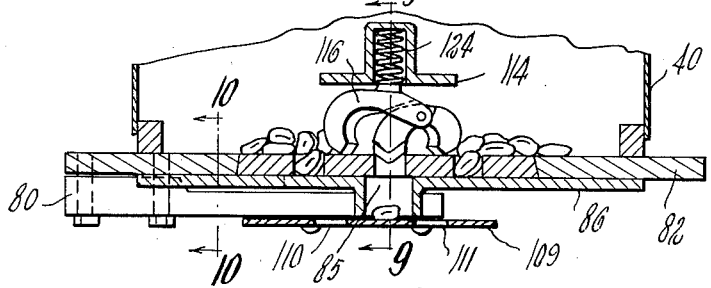
Figure 6 is a section on the line 6—6 of Figure 3.
Figure 7:
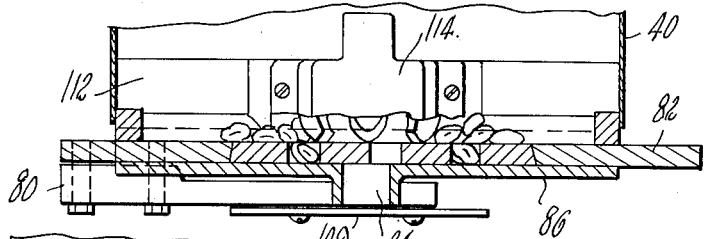
Figure 7 is a partial section on the line 5—5 of Figure 3, the moving parts being in positions of operation differing from those shown in Figure 3.

The arm 80 also carries a distributor plate 109 which closely underlies the port 85 and is adapted to support temporarily seeds which are dropped by the slide 82 through this port when the machine is adjusted for drilling. The plate 109 is provided with two spaced openings 110 and 111 (Figures 6 and 11), the function of which is hereinafter explained. Above the slide 82 within the hopper 40 is mounted a transverse bracket 112 which includes a central casing or shield 114. The casing 114 covers the ports 84 and 85 and shields them from access by the seeds in the hopper except for those which are brought in by the slide 82. This casing covers two compound, spring-pressed pawls 116 (Figures 5 and 6). Each pawl has three noses 118, 120, and 122 all of which are downwardly pressed by a spring 124 which is also within the casing 114. Of these two pawls, one operates on the seed gauge 88 and the other on the seed gauge 90, the structure and operation of both pawls being the same. As the slide 82 reciprocates, the apertures of the seed gauges pass beneath the noses of the pawls. The noses 118 and 122 ride over the apertures which have received kernels of corn or other seed and brush aside the overlying kernels so that when the apertures come into registry with one of the ports 84 and 85, each will discharge through such port a single seed. In order to avoid the possibility of such seed sticking in an aperture, the pawl noses 120 are directly above the ports 84 and 85 and serve as knock-down elements to press the seeds down so that they fall freely through the ports.

The distributor plate 109 with its two apertures 110 and 111 is employed when the mechanism is used for drilling, that is, planting seeds one by one. The operation of the slide 82 is diagrammatically illustrated in Figures 11 through 15. Figure 11 shows the slide 82 at the end of its stroke toward the right just as it is about to start toward the left. When in this position the apertures 92 and 98 are covered by the casing 114 but the apertures 94, 96, 100 and 102 are exposed to the mass of seeds in the hopper 40. When the slide 82 moves to its mid position in its stroke toward the left, illustrated in Figure 12, the apertures 94 and 100 then register with the ports 84 and 85 respectively and the seeds in these apertures are discharged through these ports. The seed from the aperture 94 falls directly to the ground through a tubular chute 126 (Figure 1) which communicates with the ports 84 and 85. The seed in the aperture 100 falls through the port 85 to land on the distributor plate 109 and is held by this plate until the slide moves to the position shown in Figure 13 wherein the opening 111 in the plate 109 registers with the port 85 and permits the seed on the plate to fall through the chute 126 onto the ground. The slide 82 continues toward the left to the extreme position shown in Figure 14 wherein the aperture 96 registers with the port 84 and discharges the seed through this port onto the ground. At the same time a seed falls from the aperture 102 through the port 85 onto the distributor plate 109. At the same time the apertures 92, 94, 98 and 100 are exposed to the mass of seed in the hopper and each receives a seed to carry back to the ports 84 and 85.

Figure 15 shows the first stage of the return movement of the slide 82 towards the right. At this stage the seed from the aperture 102 which has been deposited upon the distributor plate 109 falls through the opening 111 in the plate and reaches the ground after the seed from the aperture 96 has fallen through the port 84 to the ground. The subsequent steps of seed discharge as the slide moves on toward the extreme position shown in Figure 11 are similar to those hereinbefore described. Thus the seeds which entered those apertures in the slide are evenly spaced from one another when they reach the ground.

If it is desired to plant the seeds two by two, it is merely necessary to remove the distributor plate 109. In such case, the slide as it moves toward the left as in the position shown in Figure 11 carries the seeds in the apertures 94 and 100 to the ports 84 and 85 through which they drop simultaneously through the chute 126 to the ground. When the slide reaches the position shown in Figure 14, the seeds in the apertures 96 and 102 fall simultaneously through the ports and through the chute 126 to the ground. In a like manner on the reverse stroke the seeds in the apertures 94 and 100 fall simultaneously through the ports followed by the seeds in the apertures 92 and 98.

If it is desired to plant groups of three or four seeds, the distributor plate 109 is replaced by a different distributor plate 130 (Figure 18) which is wide enough to underlie the port 84 as well as the port 85. This plate has an elongated opening 132 which is adapted to register simultaneously with both of the ports 84 and 85. In planting groups of four seeds, the machine operates as illustrated in Figures 19 and 20. Figure 19 shows the slide 82 moving toward the left and at the midpoint of its stroke. At this moment the opening 132 in the slide 130 registers with the ports 84 and 85 so that seeds are dropped through to the ground. When the slide continues its movement toward the left to the position shown in Figure 20, the apertures 96 and 102 discharge their seeds into the ports 84 and 85 but these seeds are retained by the distributor plate 130. The slide 82 then reverses and moves toward the right. The seeds on the distributor plate are retained until the opening 132 moves into registry with the ports 84 and 85. At the same time the apertures 94 and 100 also move into registry with the ports so that the two seeds which have been brought by the apertures 94 and 100 drop through the ports together with the two seeds which have previously been deposited on the plate 130. Thus all four seeds drop through the chute 126 to the ground simultaneously to make a hill. The remaining portion of the stroke toward the right results in seeds from the apertures 92 and 98 being deposited through the ports onto the plate 130 to await the arrival of two additional seeds in the first half of the next stroke toward the left.

If hills of three seeds are desired the plate 130 is employed and one of the seed gauges 88 or 90 is replaced by a gauge 104 (Figure 21) which has two apertures instead of three. The operation of this combination is illustrated in Figures 22 and 23. When the slide 82 in moving toward the left reaches the mid position shown in Figure 22, the seeds which have been brought to the ports are discharged to the ground. Further movement toward the left to the position shown in Figure 23 causes the seeds in apertures 108 and 102 to fall through the ports 84 and 85 onto the distributor plate 130. When the slide 82 returns toward the right to its mid position the seed in the aperture 100 is added to the two seeds already carried by the distributor plate 130 and these three seeds are dropped together through the opening 132 which moves into registry with the ports simultaneously with the aperture 100.

The fertilizer is dispensed from the hopper 38 through the apertures 140 in the annular rim of the fertilizer wheel 70. This wheel has a hub portion consisting of a cap 142 which fits on the upper end of the vertical shaft 66 and is keyed thereto so that it is positively driven thereby. The wheel 70 overlies the floor 144 of the fertilizer hopper 38. This floor has two openings 146 and 148 therethrough underlying elevated arcuate baffle elements 150 and 152 which prevent an unchecked flow of fertilizer downward through the ports 146 and 148 when apertures 140 in the wheel move into registry therewith. The ports 146 and 148 communicate with tubular chutes (not shown) which direct the fertilizer to the ground so that the doses of fertilizer reach the ground on either side of each seed or group of seeds deposited from the seed hopper. As the fertilizer wheel 70 rotates in timed relation with the movements of the seed slide 82, pairs of opposite apertures 140 move into registry with the ports 146 and 148 to permit separate doses of fertilizer to fall through to the ground. The effective size of the ports 146 and 148 can be readily varied by means of a manually operable slide 156 which underlies the ports 146 and 148 and is provided with two openings of the same size. Movement of the slide 156 toward the left (Figure 3) moves the openings therein into offset positions with respect to the ports 146 and 148, thus partially closing these ports and reducing their effective size.

The vertical shaft 66 drives both the fertilizer wheel 70 and the slide 82 so that these two dispensing members operate in timed relation and charges of fertilizer are deposited on opposite sides of each seed which is dropped when the machine is drilling, four individual seeds being successively dropped during each stroke of the slide 82. Hence in the same interval four pairs of charges of fertilizer are dropped through the ports 146 and 148. If the distributor plate 109 is removed for hilling, seeds are dropped only twice during each stroke of the slide 82. Hence to avoid waste of fertilizer, alternate openings 140 in the fertilizer wheel are closed by any suitable means such as thin blocks (not shown) which are shaped to fit in any of the openings 140, these blocks having top flanges to keep them from falling through.

The seed hopper 40 may be equipped with a removable transverse partition 160 (Figure 24) so that two different kinds of seed can be planted alternately, as, for example, corn and soy beans.

The seeds falling from the hopper are directed by the chute 126 to a shallow furrow formed by a bifurcated runner 162. On either side of this runner is a disc furrower 164. These furrowers extend down lower than the runner to plow deeper furrows for the reception of the charges of fertilizer. The furrows are then filled by adjustable spring-mounted coverers 166 and the loose earth is firmed by the tread of the vehicle wheel 36 which may be especially shaped as indicated in Figure 8 for this purpose.

We claim:

1. In a seed-planting machine, a hopper with a horizontal floor elongated transversely with reference to the direction of movement of the machine, said floor having two central ports therethrough in line with said direction of movement, a shield mounted above said ports to cover the same, an elongated slide reciprocably mounted between said floor and shield, said slide having a series of seed-receiving apertures along each of its side edges, the apertures of each series being movable by reciprocation of the slide from positions of exposure to the interior of the hopper to register with one of said ports under the shield, and means for reciprocating said slide as said machine advances and means for causing a brief dwell in the movement of the slide each time a seed-receiving aperture registers with one of the ports.

2. In a seed-planting machine, a hopper with a horizontal floor elongated transversely with reference to the direction of movement of the machine, said floor having two central ports therethrough in line with said direction of movement, a shield mounted above said ports to cover the same, an elongated slide reciprocably mounted between said floor and shield, said slide having a series of seed-receiving apertures along each of its side edges, the apertures of each series being movable by reciprocation of the slide from positions of exposure to the interior of the hopper to register with one of said ports under the shield, means for intercepting the individual seeds dropping through one of said ports and for dropping said intercepted seeds in evenly spaced alternation with the seeds dropping through the other said port, and means for reciprocating said slide as said machine advances.

3. In a seed-planting machine, a hopper with a horizontal floor elongated transversely with reference to the direction of movement of the machine, said floor having two central ports therethrough in line with said direction of movement, a shield mounted above said ports to cover the same, an elongated slide reciprocably mounted between said floor and shield, said slide having a series of seed-receiving apertures along each of its side edges, the apertures of each series being movable by reciprocation of the slide from positions of exposure to the interior of the hopper to register with one of said ports under the shield, a horizontal plate mounted immediately below said floor to reciprocate with said slide, said plate having an opening therethrough arranged to move into and out of registry with one of said slide reciprocates, and means for reciprocating said slide as said machine advances.

4. Apparatus as set forth in claim 2, said intercepting means comprising a distributor plate immediately below one of said ports and connected with said slide for reciprocation therewith, said distributor plate having two openings therethrough movable successively into registry with said port during each stroke of the slide and plate.

References Cited in the file of this patent

UNITED STATES PATENTS

| Number | Name | Date |
|---|---|---|
| 88,812 | Runstetler | Apr. 13, 1869 |
| 129,924 | Bowman | July 30, 1872 |
| 171,462 | Wishard | Dec. 21, 1875 |
| 317,968 | Bunn | May 19, 1885 |
| 398,701 | Carter | Feb. 26, 1889 |
| 493,146 | Bender | Mar. 7, 1893 |
| 513,940 | Kelly | Jan. 30, 1894 |
| 673,326 | Perry | Apr. 30, 1901 |
| 1,993,649 | Crutcher | Mar. 5, 1935 |
| 2,042,014 | Michael et al. | May 26, 1936 |
| 2,046,089 | Rebbahn | June 30, 1936 |
| 2,575,985 | Thompson | Nov. 20, 1951 |
| 2,605,935 | Huitema | Aug. 5, 1952 |